US009523378B2

(12) United States Patent
Hötzeldt

(10) Patent No.: US 9,523,378 B2
(45) Date of Patent: Dec. 20, 2016

(54) ARRANGEMENT FOR FASTENING AIRCRAFT INTERIOR-TRIM COMPONENTS

(71) Applicant: Airbus Operations GmbH, Hamburg (DE)

(72) Inventor: Stephan Hötzeldt, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 504 days.

(21) Appl. No.: 14/025,385

(22) Filed: Sep. 12, 2013

(65) Prior Publication Data

US 2014/0091179 A1 Apr. 3, 2014

Related U.S. Application Data

(60) Provisional application No. 61/700,678, filed on Sep. 13, 2012.

(30) Foreign Application Priority Data

Sep. 13, 2012 (DE) .................. 10 2012 216 240

(51) Int. Cl.
*F16B 5/00* (2006.01)
*F16B 5/06* (2006.01)
*B64C 1/06* (2006.01)

(52) U.S. Cl.
CPC ............... *F16B 5/00* (2013.01); *F16B 5/0635* (2013.01); *B64C 1/066* (2013.01)

(58) Field of Classification Search
CPC ....... F16B 37/04; F16B 37/041; F16B 37/043; F16B 37/044; F16B 5/06; F16B 5/0635; F16B 5/0642; F16B 5/0657; F16B 39/24; F16B 39/282; B64C 1/061; B64C 1/066; B64C 1/06
See application file for complete search history.

(56) References Cited

U.S. PATENT DOCUMENTS 3,670,796 A * 6/1972 Grimm ................. F16B 37/044
411/112
4,074,491 A * 2/1978 Bell ........................ B64C 1/06
411/116

(Continued)

FOREIGN PATENT DOCUMENTS

DE           30 12 899       10/1980
DE      10 2007 056 471       5/2009

(Continued)

OTHER PUBLICATIONS

German Office Action for Application No. 10 2012 216 240.2 dated Jul. 25, 2013.

*Primary Examiner* — Daniel Wiley
(74) *Attorney, Agent, or Firm* — Jenkins, Wilson, Taylor & Hunt, P.A.

(57) ABSTRACT

A fastening arrangement for fastening an aircraft interior-trim component to an aircraft structural element, including a pin, including a first coupling element having a bearing-contact face portion, wherein the first bearing-contact face thereof has an engagement projection provided to engage with an opening in the surface of the aircraft interior-trim component. An engagement surface of the bearing-contact face portion includes an engagement element arrangement and includes a spacer fixable relative to the aircraft structural element. An engagement face is provided with an engagement element arrangement and includes a through-bore. When the engagement surface of the coupling element is in bearing contact with an engagement face of the spacer, the coupling element and the spacer cannot be displaced with respect to each other in the plane of the engagement surface, and engagement of the engagement elements arrangement is possible in relative positions of the engagement surface and the engagement face.

11 Claims, 3 Drawing Sheets

(56) References Cited

U.S. PATENT DOCUMENTS

| | | | | |
|---|---|---|---|---|
| 4,219,064 | A * | 8/1980 | Lozano | F16B 37/044 |
| | | | | 411/103 |
| 4,286,642 | A * | 9/1981 | Keatley | F16F 1/36 |
| | | | | 29/453 |
| 4,778,321 | A * | 10/1988 | Okawa | F16B 4/004 |
| | | | | 411/523 |
| 5,073,072 | A * | 12/1991 | Parekh | F16B 3/06 |
| | | | | 403/408.1 |
| 5,339,500 | A * | 8/1994 | Muller | F16B 37/041 |
| | | | | 24/514 |
| 6,287,064 | B1 | 9/2001 | Jhumra | |
| 6,854,941 | B2 * | 2/2005 | Csik | F16B 37/044 |
| | | | | 411/111 |
| 7,648,319 | B1 | 1/2010 | Ochoa | |
| 7,748,081 | B2 * | 7/2010 | Ganter | E05D 7/04 |
| | | | | 16/235 |
| 8,177,466 | B2 * | 5/2012 | Csik | F16B 37/043 |
| | | | | 411/174 |
| 2008/0310931 | A1 | 12/2008 | Csik | |

FOREIGN PATENT DOCUMENTS

| | | |
|---|---|---|
| DE | 10 2012 216 240.2 | 4/2014 |
| WO | WO 2004/092596 | 10/2004 |
| WO | WO 2011/131290 | 10/2011 |

\* cited by examiner

ARRANGEMENT FOR FASTENING AIRCRAFT INTERIOR-TRIM COMPONENTS

CROSS-REFERENCE TO RELATED APPLICATIONS

This application claims priority to and the benefit of German Application No. DE 10 2012 216 240.2 and to U.S. Provisional Application No. 61/700,678, both of which were filed on Sep. 13, 2012, the entire disclosures of which are both incorporated by reference herein.

TECHNICAL FIELD

The present invention relates to a fastening arrangement for fastening aircraft interior-trim components to an aircraft structural element, comprising a pin, which has a cylindrical portion and has a head whose dimensions perpendicularly in relation to the longitudinal axis of the pin are greater than those of the cylindrical portion.

In the interior of aircraft, it is necessary to fasten aircraft interior-trim components at many locations, and in particular to fasten flat cladding elements to the aircraft structure, i.e. to an element of the primary or secondary structure. It is desirable in such cases that these components can be mounted as easily and rapidly as possible, but, at the same time, the fastening must be reliable and there must be no vibrations in the region of the fastening.

BACKGROUND

There is already known from WO 2011/131290 A2, from which the present invention proceeds, a fastening arrangement for aircraft interior-trim components in which a pin extends through bores in the components, wherein a sealing disc is arranged between the components.

In the case of aircraft interior-trim components, the fastening points on the aircraft structure are fixedly predefined and, in order to accommodate tolerances in the dimensions of the components, in the case of this arrangement from the state of the art there is no direct form closure between the components and the aircraft structure, such that there is no direct load path between the components and the structure.

SUMMARY

Proceeding from this state of the art, it is therefore the object of the present invention to provide an easily mounted fastening arrangement that, on the one hand, ensures a direct load path between the aircraft interior-trim component and the aircraft structure and, on the other hand, can accommodate tolerances in the dimensions of the components.

According to the invention, this object is achieved in that the fastening arrangement is characterized by a first coupling element, which has a bearing-contact face portion that has a through-bore and has a first bearing-contact face for bearing contact on a surface of the aircraft interior-trim component, wherein the first bearing-contact face has an engagement projection provided to engage with an opening in the surface of the aircraft interior-trim component, wherein a first engagement surface of the bearing-contact face portion that faces away from the first bearing-contact face is provided with a first engagement element arrangement, a first spacer, which is adapted to be fixed relative to the aircraft structural element, and which has a first engagement face provided with a second engagement element arrangement, and which has a first receiving face opposite the first engagement face, and which has a through-bore, wherein the first and second engagement element arrangements are configured in such a manner that, when the engagement surface of the coupling element is in bearing contact with an engagement face of the spacer, with the first and second engagement element arrangements being engaged, the coupling element and the spacer cannot be displaced with respect to each other in the plane of the engagement surface, and an engagement of the first and the second engagement element arrangement is possible in a multiplicity of relative positions of the engagement surface and of the engagement face, wherein the pin extends through the through-bores of the first coupling element and of the first spacer, and wherein the first engagement surface of the first coupling element faces towards the first engagement face of the first spacer.

The arrangement according to the invention is mounted in such a manner that the first coupling element is fixed to an aircraft interior-trim component via the engagement projection, wherein the pin then extends through the through-bores in the first coupling element and in the first spacer, and through a bore in the component that is aligned to these bores. The pin, in turn, is fixed in a fixedly predefined position in a bore of the aircraft structural element. The structure of the engagement element arrangements enables the coupling element, with the aircraft interior-trim component attached thereto in a form-closed manner, to be brought into engagement in a form-closed manner, in differing relative positions, with the first spacer, wherein the latter, in turn, is connected to the aircraft structural element in a form-closed manner, either by means of a form closure between the pin and the first spacer, or because its first receiving face is designed to be fixed to the aircraft structural element.

For the differing relative positions, therefore, a direct load path is in each case created between the aircraft interior-trim component and the structural element, with the result that the fastening arrangement is also suitable for components whose dimensions are subject to relatively large tolerances.

In a preferred embodiment for fastening two aircraft interior-trim components, the fastening arrangement is additionally provided with a second coupling element, which has a bearing-contact face portion that has a through-bore and has a second bearing-contact face for bearing contact on a surface of a second aircraft interior-trim component, wherein the second bearing-contact face has an engagement projection provided to engage with an opening in the surface of the second aircraft interior-trim component, wherein the second engagement surface of the bearing-contact face portion that faces away from the second bearing-contact face is provided with the first engagement element arrangement, and with a second spacer, which has a second engagement face provided with the second engagement element arrangement, and which has a second receiving face that is opposite the second engagement face and designed to be fixed to the aircraft structural element, and which has a through-bore, wherein the second engagement surface of the second coupling element faces towards the second engagement face of the second spacer, wherein the pin extends through the through-bores of the second spacer and of the second coupling element, wherein the first receiving face of the first spacer bears against the head of the pin, and wherein the first and the second coupling element are arranged between the first and the second spacer and the bearing-contact faces of the coupling elements face towards each other.

In the case of this preferred form of the arrangement, the second spacer is first fixed with its second receiving face on the element of the aircraft structure, wherein this can be effected, for example, by riveting or adhesive bonding. However, other possibilities for fixing the second spacer are also conceivable. The first and the second coupling element, by means of the engagement projections provided thereon and by means of corresponding openings in the components, can then be brought into engagement with the latter, wherein the first coupling element engages with a first aircraft interior-trim component and the second coupling element engages with a second aircraft interior-trim component. The coupling elements in this case are arranged on the components such that their through-bores are aligned to bores in the components.

Preferably, the coupling elements are provided with a clamping portion, which extends parallel to and at a distance from the bearing-contact face portion, and which is connected to the bearing-contact face portion via a connecting portion, and which has a bore aligned to the through-bore in the bearing-contact face portion. Consequently, the coupling elements have a U-shaped cross-section, can be easily pushed on to the first and second component and, because of the clamping action between the clamping portion and the bearing-contact face portion, can be fixed to the components in advance.

After the coupling elements have been attached to the components, the pin can be guided through the through-bores in the coupling elements, wherein these through-bores are preferably of a diameter that is greater than the dimensions of the cylindrical portion of the pin.

When the pin is being inserted in the coupling elements, it is also guided through the through-bore in the first spacer, such that the first spacer is arranged between the head of the pin and the engagement surface of the first coupling element, such that it is closest to the head of the pin, such that the engagement surface of this first coupling element and the engagement face of the first spacer are opposite each other.

This arrangement, of the first spacer and the two first and second components provided with the coupling elements, all of which are pushed on to the pin, is then first guided, with the free end of the pin, into the through-bore of the second spacer, and then into a receiving bore, provided underneath, for the pin in the element of the aircraft structure. This bore is matched to the dimensions of the pin, and the receiving bore can be provided, in particular, with a clamping element, in which a spherically shaped end of the pin latches-in, wherein the pin is thereby precisely positioned in a predefined position relative to the aircraft structural element.

The position of the pin relative to the first spacer is fixed, owing to the bore in the latter. The first spacer, in turn, can engage, in a multiplicity of differing relative positions, with the first coupling element, which faces towards it and which receives the first component, in such a manner that the relative position is in each case fixed by a form closure, since the first and second engagement element arrangements are configured thereon in such a manner that, when the engagement surfaces are in bearing contact, they cannot be displaced with respect to each other in the plane of the engagement surface. Consequently, in the case of the differing relative positions between a coupling element and a first spacer, there is nevertheless ultimately a form closure between the pin and thereby the aircraft structural element, on the one hand, and the first component, on the other hand, with the result that, here likewise, a direct load path is formed between the first component and the aircraft structure.

Similarly, when the pin is being inserted, the second component also can be brought into engagement with the second spacer in a form-closed manner, in differing relative positions, by means of the second coupling element fixed to the second component via the engagement projection. As a result, a load path is also formed between the second component and the aircraft structural element, since the second spacer is fixedly connected thereto.

In the case of both the first and the second component, however, owing to the configuration of the first and second engagement arrangements, there are a multiplicity of possible relative positions, relative to the pin, or the receiving bore, in the aircraft structural element, in which the respective load path is realized, with the result that the fastening arrangement guarantees these load paths even in the case of production tolerances in the dimensions of the first and second components.

Preferably, the engagement projection of the coupling elements is formed as a collar on the bearing-contact face, which collar extends around the through-bore. In this case, the collar can be easily inserted in the through-bore provided in the components, thereby realizing the form closure between the coupling element and the component.

It is furthermore preferred if a disc of elastic material is arranged between the clamping portions preferably provided on the coupling elements, wherein the pin extends through the bore of the disc. The disc serves, on the one hand, as a sealing element and, on the other hand, it provides vibration damping, since it presses the coupling elements away from each other and thereby into engagement with spacers. If, moreover, the bore of the disc corresponds to the dimensions of the cylindrical portion of the pin, the disc has the additional effect that it holds the first spacer, and the first coupling element bearing directly against the latter, on the pin, with the result that said spacer and coupling element cannot easily slip down from the latter.

In a preferred embodiment, the first and second engagement element arrangements are formed in such a manner that a multiplicity of pyramids are provided, which directly adjoin each other, such that a pyramid toothing is formed upon engagement of the first and second engagement arrangement. As a result, a form closure between the respective coupling element, on the one hand, and the spacers, on the other hand, is easily realized in a multiplicity of relative positions.

To facilitate insertion of the pin into the through-bore of the second spacer, it is additionally preferred if the through-bore of the second spacer has a conical portion, such that the diameter of the through-bore widens towards the second engagement face.

Finally, the head of the pin is preferably conical in form, such that the dimensions of the head decrease towards the cylindrical portion. As a result, the position of the first spacer relative to the pin can be fixed such that it is free of play.

BRIEF DESCRIPTION OF THE DRAWINGS

The present invention is explained in the following on the basis of a drawing, which shows only one preferred embodiment example, wherein.

DETAILED DESCRIPTION

Figure 1:
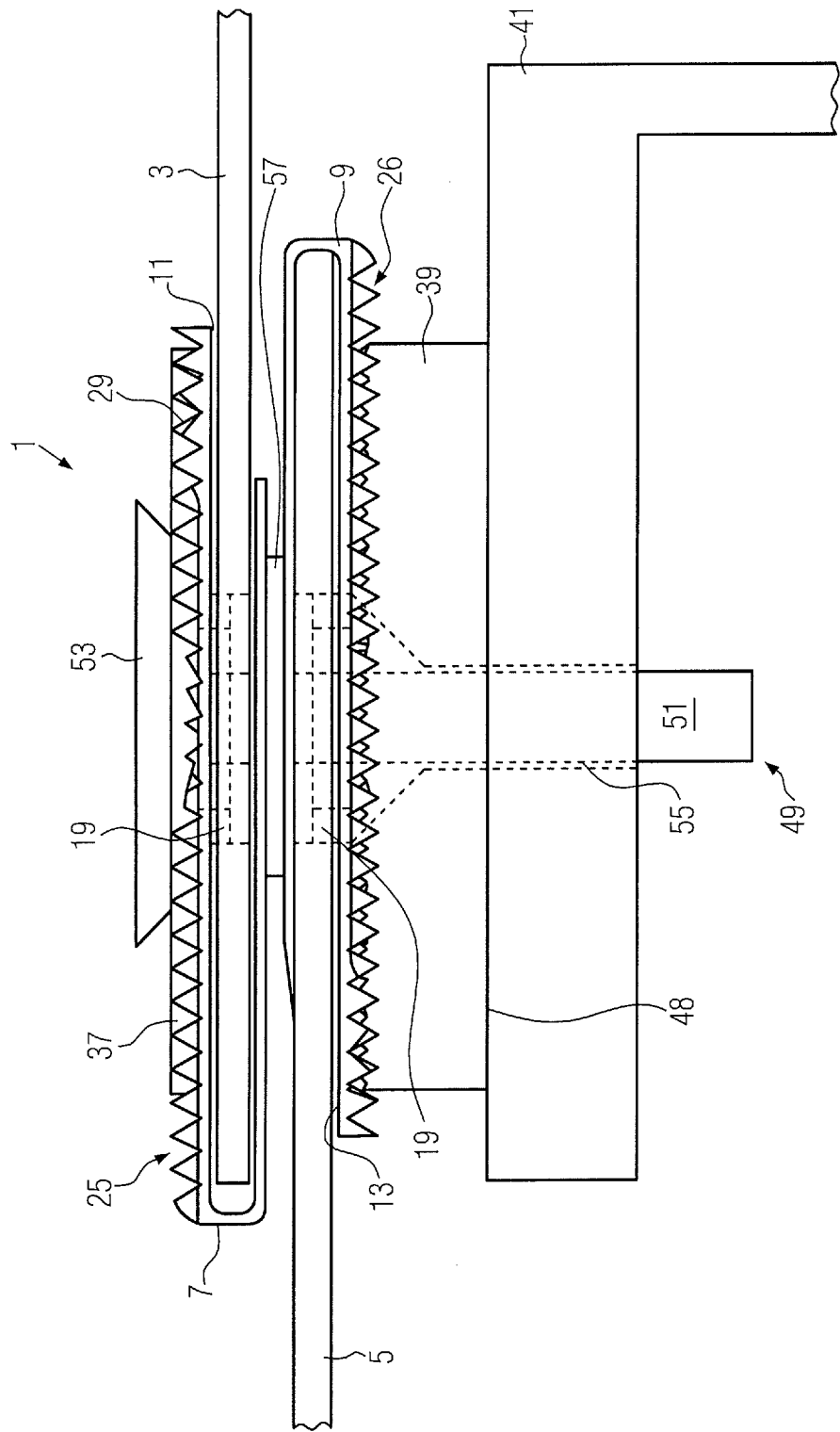
FIG. 1 shows the exemplary embodiment of a fastening arrangement according to the present invention, in side view.

As shown by the side view of the embodiment example of a fastening arrangement 1 according to the invention for fastening a first and a second aircraft interior-trim component 3, 5, said arrangement, firstly, has a first coupling element 7 and a second coupling element 9. The first coupling element 7 in this case receives the first component 3, wherein a first bearing-contact face 11 of the first coupling element 7 bears against the first component 3, which is planar in form. Similarly, the second coupling element 9 receives the second component 5, wherein, here likewise, a second bearing-contact face 13 of the second coupling element bears against a surface of the second component 5.

Figure 2:
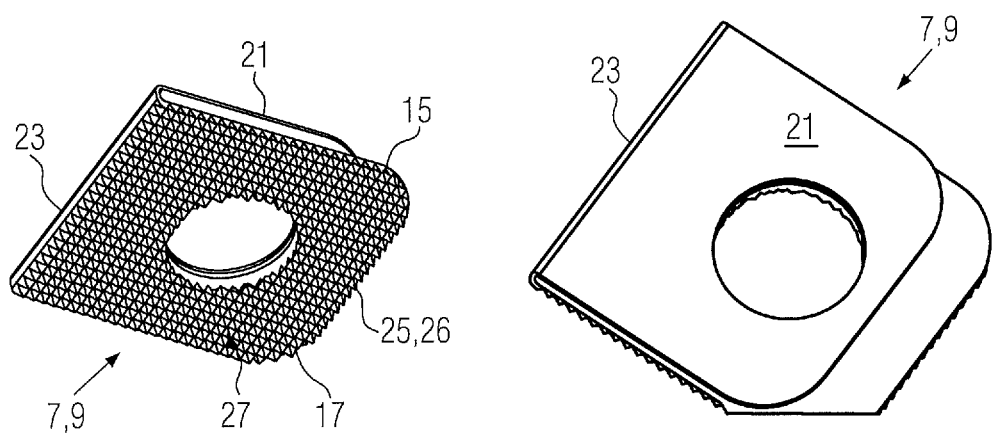
FIG. 2 shows one of the coupling elements of the embodiment example from FIG. 1, in differing perspective representations.
Figure 3:
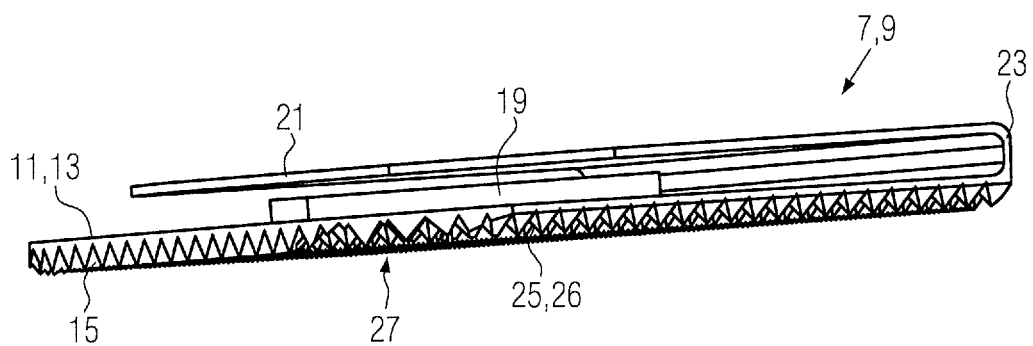
FIG. 3 shows the coupling element from FIG. 1, in a side view.
Figure 4:
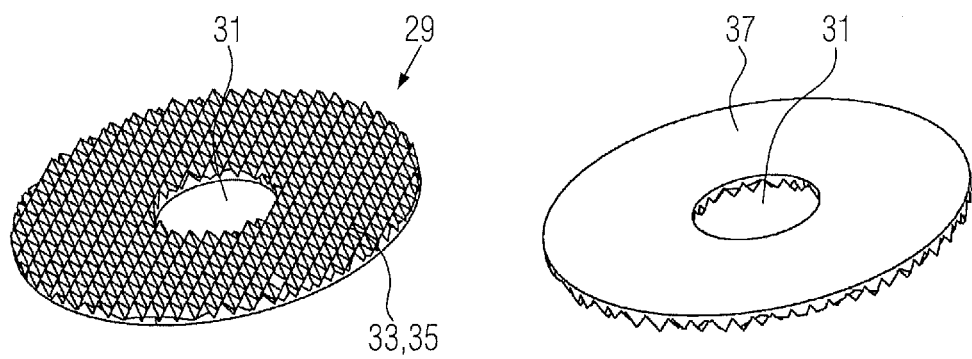
FIG. 4 shows the first spacer of the embodiment example from FIG. 1, in differing perspective representations.
Figure 5:
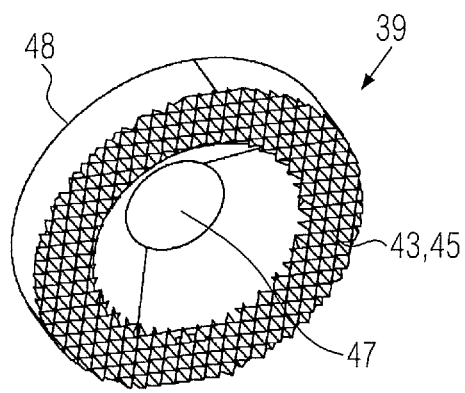
FIG. 5 shows the second spacer of the embodiment example from FIG. 1, in a perspective representation.

The coupling elements 7, 9 used in the case of this embodiment example are of identical design, and are represented in detail in FIGS. 2 and 3. However, the coupling elements 7, 9 need not necessarily be of identical design, but for cost reasons such a structure is advantageous.

The first and the second coupling element 7, 9 have a bearing-contact face portion 15, which is provided with a through-bore 17, and which comprises the first and the second bearing-contact face 11, 13, respectively, with which the bearing-contact face portion bears against the components 3, 5. The bearing-contact face 11, 13 has an engagement projection, which, in the preferred embodiment example represented here, is formed as collar 19 that projects from the bearing-contact face 11, 13 and surrounds the through-bore.

In addition to the bearing-contact face portion, the coupling elements 7, 9 additionally have a clamping portion 21, which extends parallel to and at a distance from the bearing-contact face portion 15, and which likewise has a through-bore that is aligned to the through-bore 17 in the bearing-contact face portion 15. The clamping portion 21 is provided over a connecting portion 23 that comprises the bearing-contact face portion 15, such that the coupling elements 7, 9 have a U-shaped cross-section.

In addition, on the side that faces away from the bearing-contact face 11, 13, the bearing-contact face portion 15 has a first and a second engagement surface 25, 26, respectively, which, in the case of the preferred embodiment example represented here, is provided with a first engagement element arrangement 27 constituted by a multiplicity of pyramids that directly adjoin each other.

Furthermore, the fastening arrangement 1 has a first spacer 29, in the form of a disc, which is provided with a through-bore 31, and which has a first engagement face 33, on which there is provided a second engagement element arrangement 35, which, in this case, is likewise constituted by pyramids that directly adjoin each other. In addition, on the side that faces away from the first engagement face 33, the first spacer 29 has a first receiving face 37.

Furthermore, in this preferred embodiment example, the fastening arrangement 1 has a second spacer 39, likewise in the form of a disc in this case, which is provided to be fixed to the aircraft structural element 41 to which the entire fastening arrangement 1, with the aircraft interior-trim components 3, 5, is attached. The second spacer 39 has a second engagement face 43, which is likewise provided with a second engagement element arrangement 45, which, in this case likewise, is constituted by a multiplicity of pyramids that directly adjoin each other. The second spacer 39 is provided with a through-bore 47, which is configured such that its diameter increases towards the second engagement face 43, such that the through-bore 47 is conical in form, and, on the side of the second spacer 39 that faces away from the second engagement face 43, said second spacer has a second receiving face 48, via which the second spacer 39 is fixed to the aircraft structural element 41, for example by rivets or by adhesive bonding.

Finally, the fastening arrangement 1 has a pin 49, which is provided with a cylindrical portion 51, and which has a head whose dimensions perpendicularly in relation to the longitudinal axis of the pin 49 are greater than those of the cylindrical portion 51, and which extends through the through-bores of the first spacer 29, of the coupling elements 7, 9 and of the second spacer 39, into a bore 55 in the aircraft structural element 41.

In addition, provided between the first and the second coupling element 7, 9, between the two clamping portions 21, there is a disc 57 of elastic material, which has a through-bore whose dimensions correspond to those of the cylindrical portion 51, such that the disc 57 securely holds the first spacer 29 that is arranged between the disc 57 and the head 53, as well as the first coupling element 7. The first engagement element arrangement 27 provided on the engagement surface 25 on the coupling elements 7, 9, and the second engagement element arrangements 45 provided on the engagement faces 33, 43 of the first and second spacer 29, 39, which are all constituted by pyramids that directly adjoin each other, are thus configured in such a manner that, upon bearing contact of an engagement surface 25, 26 with one of the engagement faces 33, 43 of the spacers 29, 39, and an associated engagement of the engagement element arrangements 27, 25, it is ensured that, in a multiplicity of possible relative positions of the elements in relation to each other, there is nevertheless a form closure in the plane of the engagement surfaces 25, 26. Consequently, the respective coupling element 7, 9, on the one hand, and the first spacer or the second spacer 39, on the other hand, cannot be displaced with respect to each other in the plane of the engagement surface 25, 26. However, a multiplicity of relative positions, in which the latter is the case, is nevertheless possible.

In the operation of mounting the first and the second aircraft interior-trim component 3, 5, which are provided with through-bores in the region of the connection, the coupling elements 7, 9 are first, on the one hand, pushed on to the components 3, 5 in such a manner that the through-bores 17 are aligned to the bores in the components 3, 5, wherein the collar 19 then engages in the bores of the components 3, 5. The bores of the components 3 are therefore dimensioned such that there is a form closure between the collar 19 and the bore.

On the other hand, the second spacer 39 is fastened by its second receiving face 48, in the manner already mentioned, to the aircraft structural element 41, wherein in this case said aircraft structural element may be an element of the primary or secondary structure.

The first spacer 29 is then pushed on to the pin 49 in such a manner that the first receiving face 37 bears against the head 53 of the pin 49, and the first engagement face 33 of the first spacer 29 faces away from the head 53. Then the first component 3, with the first coupling element 7, is pushed on to the pin 49, such that the latter extends through the through-bore 17 in the first coupling element 7 and the bore in the first component 3. In this case, the engagement surface 25 of the first coupling element 7 then faces towards the first engagement face 33 of the first spacer 29, such that the engagement element arrangements 27, 35 are opposite each other.

Before the second component 5, together with the second coupling element 9, is pushed on to the pin 49, the disc 57 of elastic material is pushed on to the cylindrical portion of the pin 49, which disc initially securely holds the arrangement composed of a first coupling element 7 and a first spacer 29, and subsequently seals the region of the through-bores. The second coupling element 9, with the second component 5, is then pushed on to the cylindrical portion 51 of the pin 49, in a mirror-inverted manner relative to the first coupling element 7, such that the second engagement surface 26 provided on the second coupling element 9 faces away from the first coupling element 7.

This arrangement, composed of the pin 49, a first component 3 with the first coupling element 7, the disc 57 and the second coupling element 9 with a second component 5, is now inserted into the through-bore 47 of the second spacer 39, wherein, here, the conical shape of the through-bore 47 facilitates insertion.

However, since the bore 55 in the aircraft structural element 41 is of substantially the same dimensions as the cylindrical portion 51 of the pin 49, the latter is free of play. However, the engagement element arrangements 27, 35, 45 allow the first coupling element 7 to be arranged in differing relative positions, relative to the first spacer 29, in which there is nevertheless always a form closure between the first spacer 29 and the first coupling element 7. Similarly, between the second coupling element 9 and the second spacer 39, it is also possible for the latter to assume differing relative positions in relation to each other, in which there is a form closure in each case.

A load path to the aircraft structural element 41 can therefore be formed between the first component 3, which is connected in a form-closed manner, via the collar 19, to the first coupling element 7, and the form closure between the first coupling element 7 and the first spacer 29, which load path runs via the pin 49 mounted in a form-closed manner in the structural element 41, such that, here, the spacer 29 is fixed relative to the structural element 41. This direct load path is non-dependent on production tolerances in the dimensions of the first component 3.

Similarly, as a result of the form closure, via the collar 19, between the second component 5 and the second coupling element 9, and as a result of the form-closed engagement of the engagement element arrangements 27, 45 on the second coupling element 9 and on the second spacer 39, a load path is likewise formed between the second component 5 and the aircraft structural element 41, which load path, likewise, can always be realized if dimensions of the second component 5 vary within the tolerance range. Here, also, the spacer 39 is fixed to the structural element 41, in this case directly.

In the case of the embodiment example described previously, load paths are realized, in which a transmission of force is effected by form closure between two aircraft interior-trim components 3, 5, to an aircraft structural element 41, this being non-dependent on differences in the dimensions of the components 3, 5 within tolerances, wherein mounting can be effected rapidly and without a large resource requirement.

The invention, however, is not limited to the application in the case of two components 3, 5. Rather, it is already evident from the preceding description, that the principle according to the invention, that a spacer 29, 39 and a coupling element 7, 9 can be brought into engagement with each other in a form-closed manner in differing relative positions, wherein the spacer 29, 39 is fixed, indirectly if appropriate, to the structural element 41, is realized both in the case of the first component 3 and in the case of the second component 5. It is therefore also within the scope of the present invention if only one component 3, 5 is fastened to a structural element 41 in this manner.

The invention claimed is:

1. A fastening arrangement for fastening at least one aircraft interior-trim component to an aircraft structural element, the fastening arrangement comprising:
- a pin comprising a cylindrical portion and a head whose dimensions in a direction perpendicular to a longitudinal axis of the pin are greater than a dimension of the cylindrical portion in the direction perpendicular to the longitudinal axis of the pin;
- a first coupling element comprising a first bearing-contact face portion with a through-bore and a first bearing-contact face for bearing contact on a surface of the aircraft interior-trim component,
- wherein the first bearing-contact face comprises an engagement projection which engages with an opening in the surface of the aircraft interior-trim component,
- wherein a first engagement surface of the first bearing-contact face portion that faces away from the first bearing-contact face comprises a first engagement element arrangement;
- a first spacer adapted to be fixed relative to the aircraft structural element, the first spacer having a first engagement face comprising a second engagement element arrangement a first receiving face opposite the first engagement face, a through-bore,
- wherein the first and second engagement element arrangements are configured in such a manner that, when the first engagement surface of the coupling element is in bearing contact with the first engagement face of the spacer, with the first and second engagement element arrangements being engaged, the first coupling element and the first spacer cannot be displaced with respect to each other in a plane of the engagement surface, and an engagement of the first and the second engagement element arrangements is possible in a multiplicity of relative positions of the engagement surface and of the engagement face, and
- wherein the first engagement surface of the first coupling element faces towards the first engagement face of the first spacer;
- a second coupling element comprising a second bearing-contact face portion with a through-bore and a second bearing-contact face for bearing contact on a surface of a second aircraft interior-trim component,
- wherein the second bearing-contact face comprises an engagement projection which engages with an opening in the surface of the second aircraft interior-trim component,
- wherein a second engagement surface of the second bearing-contact face portion that faces away from the second bearing-contact face comprises the second engagement element arrangement,
- a second spacer adapted to be fixed relative to the aircraft structural element, the second spacer comprising a second engagement face comprising the second engagement element arrangement, a second receiving face opposite the second engagement face, and a through-bore,
- wherein the second engagement surface of the second coupling element faces towards the second engagement face of the second spacer, wherein the pin extends through the through-bores of the first and second spacers as well as the first and second coupling elements, wherein the first receiving face of the first spacer bears against the head of the pin, and wherein the first and the second coupling elements are arranged between the first and the second spacers and the bearing-contact faces of the first and second coupling elements face towards each other.

2. The fastening arrangement according to claim 1, wherein the first spacer is adapted to be fixed relative to the aircraft structural element in such a manner that a form closure is formed between the pin and the first spacer.

3. The fastening arrangement according to claim 1, wherein the first spacer is adapted to be fixed relative to the aircraft structural element in such a manner that the first receiving face is designed to be fixed to the aircraft structural element.

4. The fastening arrangement according claim 1, wherein the engagement projection of the coupling elements is formed as a collar on the bearing-contact face, the collar extending around the through-bore.

5. The fastening arrangement according to claim 1, wherein the through-bores of the coupling elements are of a diameter that is greater than the dimensions of the cylindrical portion of the pin.

6. The fastening arrangement according to claim 1, wherein the coupling elements have a clamping portion which extends parallel to and at a distance from the bearing-contact face portion, which is connected to the bearing-contact face portion via a connecting portion, and which has a bore aligned to the through-bore in the bearing-contact face portion.

7. The fastening arrangement according to claim 6, wherein a disc of elastic material is arranged between the clamping portions of the first and the second coupling element, wherein the pin extends through a bore of the disc.

8. The fastening arrangement according to claim 7, wherein the bore of the disc corresponds to the dimensions of the cylindrical portion of the pin.

9. The fastening arrangement according to claim 1, wherein the first and second engagement element arrangements have a multiplicity of pyramids that directly adjoin each other such that a pyramid toothing is formed upon engagement of the first and second engagement arrangements.

10. The fastening arrangement according to claim 1, wherein the through-bore of the second spacer has a conical portion, such that a diameter of the through-bore widens towards the second engagement face.

11. The fastening arrangement according to claim 1, wherein the head of the pin is conical in form such that the dimensions of the head decrease towards the cylindrical portion.

* * * * *